(12) United States Patent
Matsumoto et al.

(10) Patent No.: US 7,381,143 B2
(45) Date of Patent: *Jun. 3, 2008

(54) TRANSMISSION APPARATUS FOR A BICYCLE

(75) Inventors: Shinya Matsumoto, Saitama (JP); Yoshiaki Tsukada, Saitama (JP); Takeshi Hashimoto, Saitama (JP); Naoki Inoue, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 773 days.

This patent is subject to a terminal disclaimer.

(21) Appl. No.: 10/796,573

(22) Filed: Mar. 9, 2004

(65) Prior Publication Data
US 2004/0192480 A1 Sep. 30, 2004

(30) Foreign Application Priority Data
Mar. 26, 2003 (JP) .............................. 2003-086358
Mar. 26, 2003 (JP) .............................. 2003-086360

(51) Int. Cl.
*F16H 9/00* (2006.01)
(52) U.S. Cl. ........................................................ 474/78
(58) Field of Classification Search .................. 474/78, 474/79, 80, 81, 82, 83
See application file for complete search history.

(56) References Cited

U.S. PATENT DOCUMENTS

| | | | |
|---|---|---|---|
| 2,428,166 A | | 9/1947 | Letourneur |
| 5,404,768 A * | | 4/1995 | Hwang et al. ................. 74/371 |
| 5,553,510 A * | | 9/1996 | Balhorn ........................ 74/354 |
| 5,611,556 A * | | 3/1997 | Davidow ..................... 280/236 |
| 5,873,590 A * | | 2/1999 | Abe et al. .................... 280/259 |
| 7,097,190 B2 * | | 8/2006 | Matsumoto et al. ...... 280/281.1 |
| 7,153,229 B2 * | | 12/2006 | Matsumoto et al. ........ 474/144 |
| 2004/0014543 A1 * | | 1/2004 | Van Der Linde ........... 474/160 |
| 2004/0192480 A1 * | | 9/2004 | Matsumoto et al. .......... 474/78 |
| 2004/0214670 A1 * | | 10/2004 | Matsumoto et al. .......... 474/78 |
| 2005/0176535 A1 * | | 8/2005 | Matsumoto et al. .......... 474/78 |
| 2005/0176536 A1 * | | 8/2005 | Matsumoto et al. .......... 474/78 |

(Continued)

FOREIGN PATENT DOCUMENTS

FR 2522102 8/1983

(Continued)

*Primary Examiner*—Vicky A. Johnson
(74) *Attorney, Agent, or Firm*—Carrier, Blackman & Associates, P.C.; William D. Blackman; Joseph P. Carrier

(57) ABSTRACT

A transmission apparatus is capable of retaining an endless transmission chain on a rotatable member, even where a small inter-axis distance remains between two rotatable shafts to which each of two rotatable members is drivingly connected. The transmission includes a drive sprocket member for connecting to a main drive shaft. The transmission also includes a driven sprocket member, connected to the output shaft in parallel with the main drive shaft and including a plurality of transmission sprockets. The transmission further includes a chain interconnecting both sprocket members, and a transmission shift mechanism for positioning the chain among the transmission sprockets. The drive sprocket member is supported at the main drive shaft in the rotary center line direction, in such a way that the chain is applied to both sprocket members in parallel with a plane crossing at a right angle with the rotary center line of the main drive shaft.

13 Claims, 7 Drawing Sheets

U.S. PATENT DOCUMENTS

2005/0215367 A1* 9/2005 Thomasberg ............... 474/78
2006/0058132 A1* 3/2006 Kaga et al. .................... 474/78
2006/0068954 A1* 3/2006 Kaga et al. .................... 474/74
2006/0068956 A1* 3/2006 Matsumoto et al. .......... 474/80
2006/0073925 A1* 4/2006 Kaga et al. .................... 474/78
2006/0240919 A1* 10/2006 Matsumoto et al. .......... 474/78
2006/0270499 A1* 11/2006 Kilshaw ...................... 474/78

FOREIGN PATENT DOCUMENTS

WO     WO 9836960     8/1998

* cited by examiner

TRANSMISSION APPARATUS FOR A BICYCLE

CROSS-REFERENCE TO RELATED APPLICATIONS

The present invention claims priority under 35 USC 119 based on Japanese patent application Nos. 2003-086358 and 2003-086360, both filed Mar. 26, 2003.

BACKGROUND OF THE INVENTION

1. Field of the Invention

This invention relates to a transmission apparatus having an endless transmission linking loop applied over first and second rotating members, so as to transmit a rotation between the first rotating member and the second rotating member. More particularly, the present invention relates to a transmission apparatus used in a bicycle, having an endless transmission linking loop applied over first and second rotating shafts so as to transmit a rotation from the first rotating shaft to the second rotating shaft, as used in a bicycle.

2. Description of the Background Art

Many different types of transmission assemblies are known, and are commercially available. One example of a known transmission apparatus, for use on a bicycle, is disclosed in Japanese Utility Model Application No. Sho 59 (1984)-172882, as well as Japanese Utility Model Laid-Open No. Sho 61 (1986)-87190, for example.

The transmission apparatus disclosed in Japanese Utility Model Application No. Sho 59 (1984)-172882 is comprised of a single-stage or multi-stage front chain gear device drivingly connected to a main drive shaft; a multi-stage sprocket device drivingly connected to the rear hub and having more stages than that of the front chain gear device; and a chain applied over the front chain gear device and the multi-stage sprocket device. Then, in the case of performing a transmission gear change, the chain is transferred from one sprocket of the multi-stage sprocket device to other sprocket by the rear derailleur, operated by an operating wire.

In the case of the transmissions taught by these references, there occurs a possibility that the chain is removed sometimes from either the chain gear or the sprocket, while the chain is inclined in respect to a plane crossing at a right angle with an axial direction when the chain is applied over the chain gear and the sprocket placed in an axial different direction because the chain gear of the front chain gear device cannot be moved axially and the multi-stage sprocket device constituted by a plurality of sprockets axially arranged shows a large axial width size. Then, when there remains a small clearance between the front chain gear device and the multi-stage sprocket device, the chain is removed more easily because inclination of the chain in respect to the right angle crossing plane becomes larger.

The present invention has been invented in view of the circumstances as described above, and it is an object of the present invention to provide a transmission apparatus capable of preventing the endless transmission linking loop from being removed from the rotating member even in the case that there remains a small inter-axis distance between the two rotating shafts to which each of the two rotating members having the endless transmission linking loop wound around themselves is drivingly connected.

It is another object of the present invention to minimize or reduce the size of the transmission apparatus.

Although the known devices have some utility for their intended purposes, there is still a need to provide an improved transmission which eliminates the traditional chain drive system for use with a bicycle. More particularly, there is a need for an improved bicycle transmission including components designed to solve the above-mentioned problems.

SUMMARY OF THE INVENTION

The invention according to a first aspect hereof is a transmission apparatus including a first rotating member drivingly connected to a first rotating shaft, and including one or more first rotating elements. The transmission also includes a second rotating member drivingly connected to a second rotating shaft, arranged in parallel with the first rotating shaft. The second rotating shaft is arranged in the rotary center line direction of the second rotating shaft and has a greater number of second rotating elements than the number of first rotating elements.

The transmission also includes an endless transmission linking loop, interconnecting the first rotating member and the second rotating member to transmit a rotation between the first rotating shaft and the second rotating shaft. The linking loop may be a belt or chain. The transmission further includes a transmission gear shift mechanism for positioning the endless transmission linking loop on a selected one of the second rotating elements for a transmission operation.

In the transmission according to a first embodiment hereof, the first rotating member is movably supported on the first rotating shaft with its rotary center line direction oriented such a way that the endless transmission linking loop is applied over the first rotating member and the second rotating member in parallel with a plane crossing the rotary center line of the first rotating shaft at a right angle.

In accordance with the present invention, the endless transmission linking loop is substantially prevented from being inclined with respect to the right-angle crossing plane, because the first rotating member is moved in a rotary center line direction in such a way that the endless transmission linking loop is applied over the first rotating member and the second rotating member along the right angle crossing plane in respect to the rotary center line also in the case that the endless transmission linking loop is wound around any one of the more predetermined number of second rotating member elements than that of the first rotating member elements.

As a result, in accordance with a first aspect of the invention, the following effects can be attained. That is, the endless transmission linking loop is retained in place on the first and second rotating member elements without any relation with an inter-axis distance between the first rotating shaft and the second rotating shaft and accordingly also in the case of short inter-axis distance, because the endless transmission linking loop is prevented from being inclined in respect to the plane crossing at a right angle with the rotary center line.

The invention described in a second aspect is constructed such that the first rotating member in the transmission apparatus described in the first aspect is constituted by the first one rotating member element, the slide mechanism allowing the first rotating member to move in its rotary center line direction is arranged between the first rotating shaft and the first rotating member, and the first rotating member is drivingly connected to the first rotating shaft through the slide mechanism.

In accordance with the aforesaid circumstances, the moving range of the first rotating member in the rotary center line direction is minimized, because the width of the first rotating member in the rotary center line direction is minimized.

As a result, in accordance with the present invention described in the second aspect, the following effects can be attained in addition to the effect of the invention described in the first aspect. That is, a size of the of the transmission apparatus in the rotary center line direction is made small, because the moving range of the first rotating member in the rotary center line direction is minimized.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION

Referring now to FIGS. 1 to 8, a selected illustrative embodiment of the present invention will be described. It should be understood that the following description is intended to illustrate, rather than to limit the invention.

Figure 1:
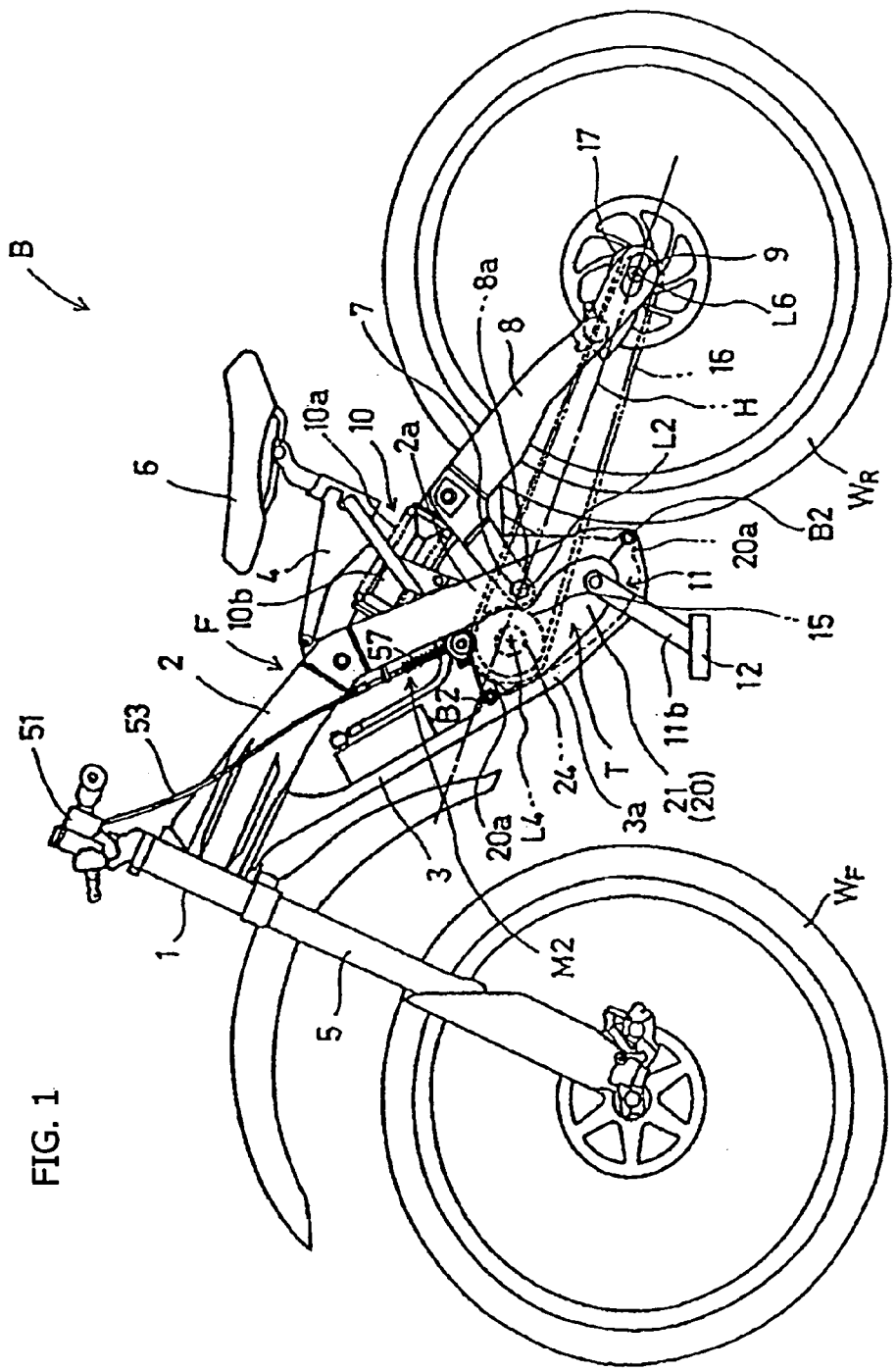
FIG. 1 is a schematic left elevational view of a bicycle incorporating a transmission according to a selected illustrative embodiment of the present invention.

Referring to FIG. 1 a bicycle B is shown, in which a transmission apparatus T according to the present invention is used. The bicycle B is a bicycle of the type commonly referred to as a 'mountain bike', and may be used off-road and for down-hill riding. The bicycle B may be ridden in a timed competition, descending a non-paved course including a high-speed corner, a jump section in a forest road, and/or other similar features.

A body frame F of the bicycle B includes a head pipe 1 for pivotally supporting a front fork 5 in a steering manner, to guide movement of a front wheel $W_F$ at its lower end. The front fork 5 includes a pair of right and left fork sections joined at the top.

The body frame F also includes a pair off right and left main frame sections 2 extending downwardly and rearwardly from the head pipe 1, as well as a down tube 3 extending downwardly from front ends of both main frame sections 2 at lower portions in a rearward and downwardly slanting direction. The body frame F also includes a saddle frame 4 extending rearwardly from the central part of each of the main frame sections 2, to support a seat or saddle 6 thereon.

As used herein, technical expressions of "upper and lower", "forward and rearward", and "right and left" in this specification are expressed in reference to a bicycle and coincide with "upper and lower", "forward and rearward", and "right and left" of the bicycle, respectively, considered from a vantage point of a rider thereof, sitting on the seat 6 and facing forwardly. In addition, a figure as seen from a side view means a figure seen from the right or left direction.

A pair of right and left swing arms 8 include front ends 8a, which are pivotally connected to the main frame sections 2 by a pivot arm 7. The swing arms 8 pivotally support the rear wheel $W_R$ through a wheel shaft 9, fixed to the rear end of each swing arm. The swing arms are supported in an oscillating manner at the pivot shaft 7, acting as a pivot portion arranged at the rear parts 2a of both main frame sections 2. Both swing arms 8 are also connected to both main frame sections 2 through a suspension 10 having both a compression spring 10a and a damper 10b. The swing arms 8 can be oscillated in an upward and downward direction around the pivot shaft 7, together with the rear wheel $W_R$.

The main drive shaft 11 and the transmission apparatus, including the transmission apparatus T and a driving power transfer mechanism are installed as component parts of the bicycle B. Then, as shown in FIG. 1, a transmission apparatus T is installed between the rear parts 2a of both main frame sections 2 and the rear part 3a of the down tube 3, positioned in front of the rear parts 2a of the lower portion of the body frame F.

The transmission apparatus T is fixed to the major shaft 11a of the main drive shaft 11 and to the aforementioned rear frame parts 2a, 3a. A driving force transfer mechanism is arranged at a right side of a body central line L1 (refer to FIG. 2), as seen from an upper and lower direction in a top plan view, a bicycle body width direction (coinciding with the right and left direction) and the transmission apparatus T.

Figure 2:
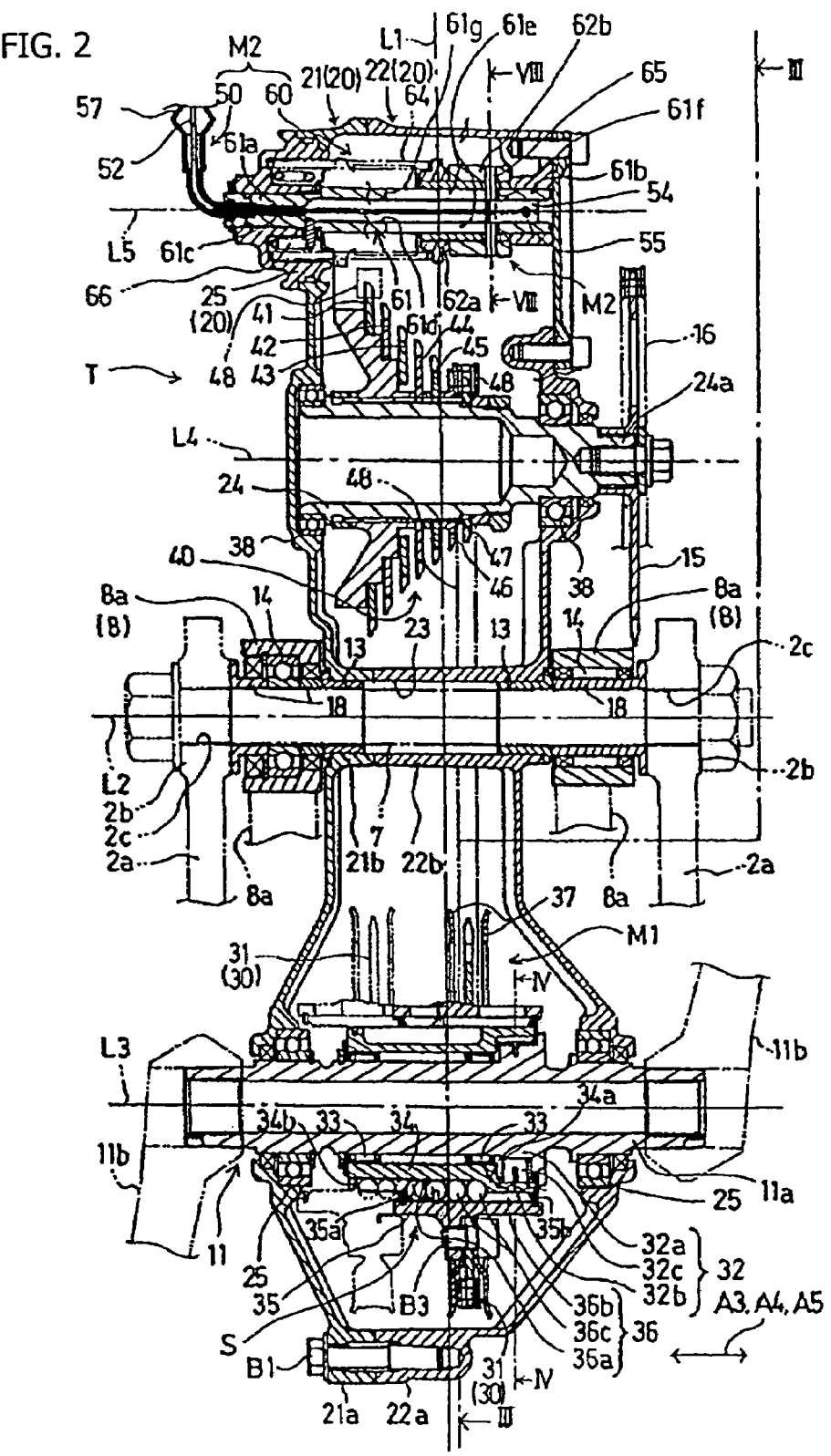
FIG. 2 is a sectional view of the transmission apparatus installed on the bicycle of FIG. 1, taken along the line II-II in FIG. 3.
Figure 3:
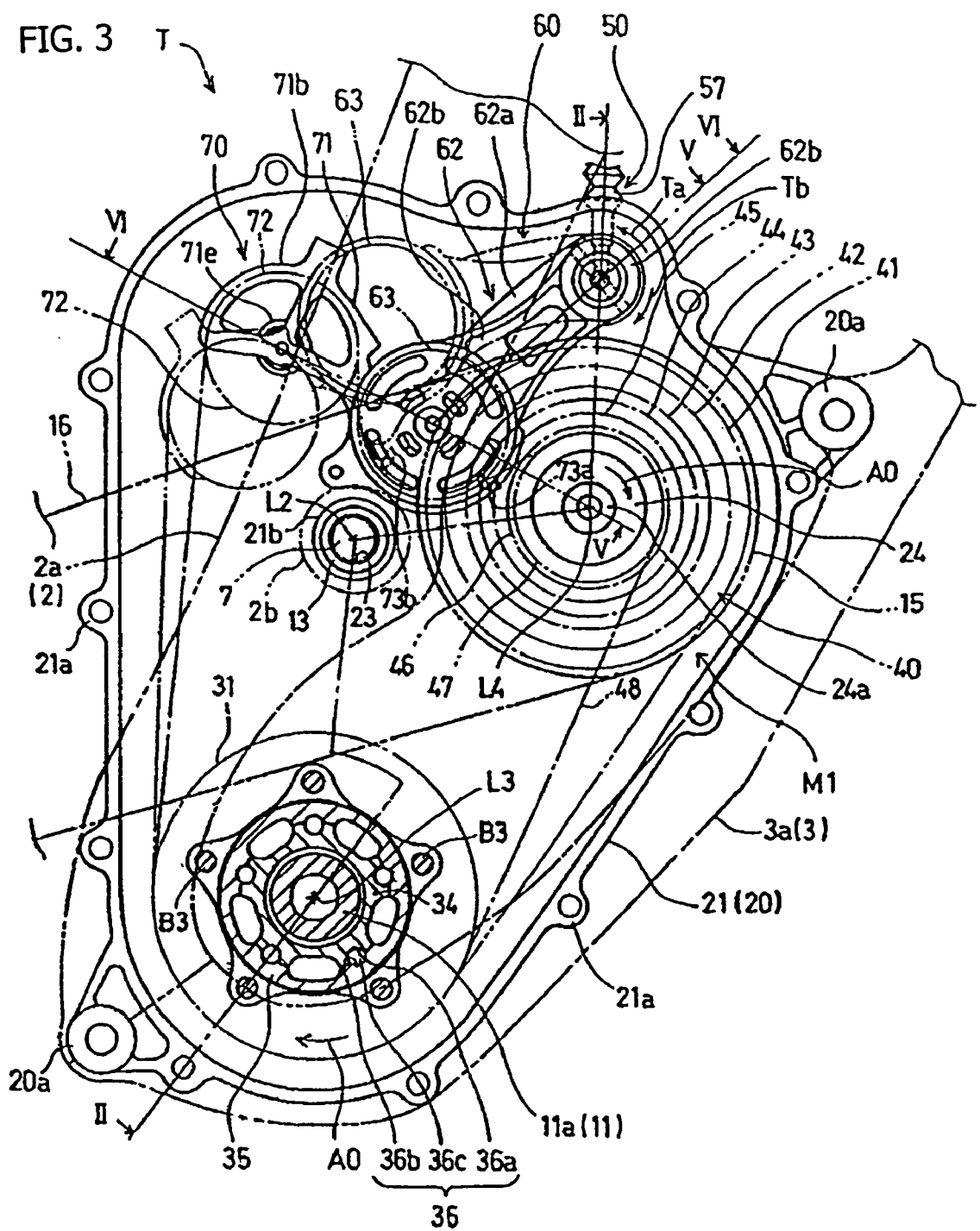
FIG. 3 is a sectional view of the transmission apparatus of FIG. 2, taken along the line III-III of FIG. 2, with a second case part of the transmission apparatus deleted from the drawing for illustrative purposes.

Referring to FIG. 3 in addition to FIG. 1, the transmission apparatus T has a metallic case 20, including a pair of right and left first and second case parts 21, 22, connected by bolts B1 at many bolt fastening segments 21a, 22a (FIG. 2) formed at the peripheral edge, and a cap 25 to be described later. The case 20 is fixed to the main frame 2 and the down tube 3 by bolts B2 at a pair of fixing segments 20a, formed at the peripheral edge part of the transmission case 20.

The main drive shaft 11 acting as a pedal-operated main drive shaft has a major shaft 11a arranged to pass through the lower part of the case 20 in a right-to-left direction, and a pair of pedal arms 11b connected to each of the right and left ends of the major shaft 11a projected outside the case 20. Then, the pedal 12 (refer to FIG. 1) is rotatably arranged at each of the pedal arms 11b.

An output shaft 24, a derailleur shaft 61 of the transmission apparatus T and the pivot shaft 7 are arranged above the major shaft 11a of the main drive shaft 11, and extending outside of the case 20, to extend in a right and left direction in such a way that their rotary center line L4 and central axis lines L5, L2 may become in parallel to each other, and each of the lines L4, L5 and L2 may become in parallel with the rotary center line L3 of the main drive shaft 11. Then, the main drive shaft 11, output shaft 24, derailleur shaft 61 and pivot shaft 7 occupy overlapped positions in the right and left direction, and at the same time, they are crossed with the body central line L1 as seen in a top plan view.

The pivot shaft 7 passes through and extends inside a pair of cylindrical bushings 13 held at each of the pass-through holes 2c formed at the pivot hub 2b of the rear part 2a of each of the main frame sections 2 and the pass-through holes 23 formed at the cylindrical parts 21b, 22b of the first and second case parts 21, 22. The pivot shaft 7 is also fixed to the rear part 2a of each of the main frame sections 2, as noted.

Each of the swing arms 8 is supported at the pivot shaft 7 in an oscillatable manner by an arrangement in which the front end 8a positioned at the right and left sides of the case 20 and between the case 20 and the rear part 2a of each of the main frame sections 2 in a right and left direction is supported at the pivot shaft 7 projected outside the case 20 through a collar 18 and a bearing 14.

Referring to FIG. 1, the output shaft 24 and the pivot shaft 7 are located within a rotating locus of the pedal arm 11b. Then, the output shaft 24 and the pivot shaft 7 are arranged in respect to the body frame F in such a way that the rotary center line L4 of the output shaft 24 is positioned in an imaginary oscillation range in an imaginary plane H including an oscillation central line L2 for both swing arms 8 (coinciding with the central axis line L2 of the pivot shaft 7) and the rotary center line L6 of the rear wheel $W_R$ (coinciding with the central axis line of the wheel shaft 9).

That is, although the imaginary plane H oscillates around the oscillation central line L2 within the aforesaid imaginary oscillation range in correspondence with the oscillation range of both swing arms 8, the rotary center line L4 of the output shaft 24 is positioned in the imaginary oscillation range.

Referring to FIGS. 2 and 3, the output shaft 24 stored in the case 20 has a right end 24a acting as one end projected outwardly from the second case 22, and then a main drive sprocket 15 acting as an output driving rotating member is connected to the right end 24a. Referring to FIG. 1 together with these figures, a chain 16, acting as a flexible endless transmission output linking loop, is applied between the main drive sprocket 15 and the driven sprocket 17, acting as the output driven rotating member drivingly connected to the rear wheel $W_R$. It will be understood that with appropriate modifications, a belt could be used in place of the chain as a linking loop.

In this case, the main drive sprocket 15, chain 16 and driven sprocket 17 constitute the aforesaid driving power transfer mechanism, for use in driving the rear wheel $W_R$ acting as the driving wheel. Then, the output shaft 24 always cooperates with the rear wheel $W_R$ and is rotated in a normal rotating direction A0 (a rotating direction where the bicycle B is moved in a forward direction, wherein a normal rotating direction of various kinds of shaft and sprocket when the main drive shaft 11 rotates in a normal rotating direction A0 is hereinafter denoted by symbol A0), and sometimes in an inverse rotating direction opposite to the normal rotating direction A0.

Further, the present invention will be described mainly in reference to the main drive shaft 11 and the transmission apparatus T.

Referring now to FIGS. 2 and 3, the transmission apparatus T includes the case 20, along with a transmission mechanism M1 and a gear shift mechanism M2, both of which are stored in the case 20. The main drive shaft 11 is stored at its portion extending through the case 20 and held by the case 20. The gear shift mechanism M2, installed at the case 20 to shift the transmission mechanism M1 to a desired transmission position, is operatively connected to the transmission mechanism M1.

In addition, the transmission mechanism M1 is provided with a one-way clutch 32, slide mechanism S, main drive sprocket 30, driven sprocket member 40, chain 48 and output shaft 24, to be described later.

The main drive shaft 11, acting as a first rotating shaft, is rotatably supported at the case 20 through a pair of right and left bearings 25. Each of the bearings 25, arranged at portions near both ends of the major shaft 11a, is held at one of the respective case parts 21, 22 within the case 20. A main sprocket member 30, acting as the first rotating member or the driving rotating member, is coaxially supported on the major shaft 11a, between both bearings 25. The main sprocket member 30 includes a main drive sprocket 31.

The main drive sprocket 31 is drivingly connected to the major shaft 11 a through a one-way clutch 32, arranged coaxial with the major shaft 11 a and through the slide mechanism S, and then the main drive sprocket 31 is rotationally driven by the main drive shaft 11. Then, as shown in FIG. 2, the main drive sprocket 31 and the one-way clutch 32 are arranged at positions where they are not overlapped to each other in a direction A3 of the rotary center line L3 of the main drive shaft 11.

Figure 4:
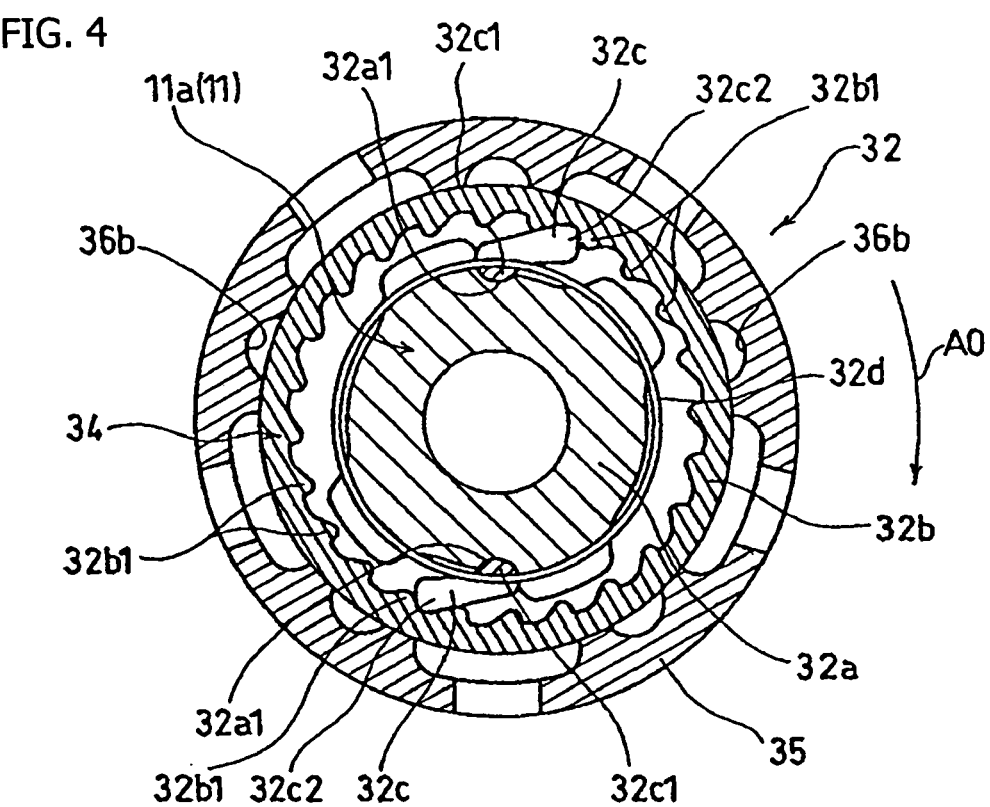
FIG. 4 is a sectional detail view of part of the transmission of FIGS. 2-3, taken along the line IV-IV of FIG. 2.

Referring to FIG. 4 together with these figures, the one-way clutch 32 is provided with a pair of ratchet pawls 32c acting as clutch elements, a clutch inner drive section 32a constituted by a part of the major shaft 11a, a clutch intermediate collar 32b constituted by a part of an inner cylinder 34 to be described later, and a ring spring 32d held by the clutch inner drive section 32a.

Each of the ratchet pawls 32c, supported at its base part 32c1 in a supporting part 32d1 composed of a notch formed at the outer circumferential surface of the clutch inner drive section 32a in an oscillatable manner, is biased by the ring spring 32d in such a way that its extremity end 32c2 may be engaged with many teeth 32b1 formed at the inner circumferential surface of the clutch intermediate collar 32b.

Then, when the clutch inner drive section 32a is rotated relatively in respect to the clutch intermediate collar 32b in the normal rotating direction A0 of the main drive shaft 11, the extremity end 32c2 of each of the clutch pawls 32c is engaged with the claw 32b1, thereby the clutch inner drive section 32a and the clutch intermediate collar 32b are concurrently rotated.

Conversely, when the clutch inner drive section 32a is relatively rotated in an inverse rotating direction opposite to the normal rotating direction A0, the extremity end 32c2 of each of the clutch pawls 32c is not engaged with the tooth 32b1, and as a result, the clutch inner drive section 32a and the clutch intermediate collar 32b can be rotated independently past each other. Due to this fact, one-way clutch 32 transmits only the rotation in the normal rotating direction A0 of the main drive shaft 11 to the main drive sprocket 31, and permits slippage when the main drive shaft 11 is rotated in the opposite direction.

Referring to FIGS. 2 and 3, a slide mechanism S is provided between the one-way clutch 32 and the main drive sprocket 31, enabling the main drive sprocket 31 to be moved axially on the shaft 11 toward the rotary center line direction A3 in respect to the major shaft 11a, and integrally rotated with the clutch intermediate collar 32b of the one-way clutch 32 at the same time.

The slide mechanism S is provided with an inner cylinder 34, having its part constituting the clutch intermediate collar 32b, and rotatably supported at the major shaft 11a in a coaxial relation with it through a pair of bearings 33 at an outer circumference of the major shaft 11a.

The slide mechanism S also includes an outer cylinder 35, arranged coaxially outside the inner cylinder 34, and a ball spline mechanism 36 acting as an engaging mechanism arranged between the outer circumferential surface of the inner cylinder 34 and the inner circumferential surface of the outer cylinder 35. Then, the main drive sprocket 31 and the chain guide 37 are connected to the outer cylinder 35 and integrally fastened by bolts B3; the main drive sprocket 31, chain guide 37 and outer cylinder 35 are rotated in an integral manner, and moved integrally in a rotary center line direction axially along the major shaft 11a.

The ball spline mechanism 36 is provided for integrally rotating the inner cylinder 34, main drive sprocket 31 and outer cylinder 35, i.e. integrally rotating the slide mechanism S and the main drive sprocket 31 and enabling the main drive sprocket 31 and the outer cylinder 35 to be moved in the rotary center line direction A3 against the inner cylinder 34 and the major shaft 11a.

The ball spline mechanism 36 includes a pair of storing grooves 36a, 36b of semi-circular section, which are formed to face towards each other in a diameter direction at equal angular positions in a circumferential direction at the outer circumferential surface of the inner cylinder 34 and the inner circumferential surface of the outer cylinder 35; and a row of balls composed of a plurality of balls 36c acting as engagement elements rotatably stored in the pair of storing grooves 36a, 36b and engaged with the inner cylinder 34 and the outer cylinder 35 in a circumferential direction.

As the pair of storing grooves 36a, 36b, a plurality of sets, five sets in this preferred embodiment are arranged, a width of each of the storing grooves 36a, 36b in the rotary center line direction A3 is larger than a width of the aforesaid row of balls at the rotary center line direction A3, and the main drive sprocket 31 can be translated in the rotary center line direction A3 within a moving range equal to the translation moving range of the changing-over moving range of the guide pulley 63 of the derailleur 60, to be described later.

Then, the inner cylinder 34 and the outer cylinder 35 are provided with first stoppers 34a, 35a and second stoppers 34b, 35b for restricting motion of the aforesaid row of balls in the rotary center line direction A3 so as to define the aforesaid moving range of the main drive sprocket 31 and the outer cylinder 35 and to prevent the balls 36c from being dropped.

The output shaft 24, acting as the second rotating shaft, is rotatably supported at the case 20 through a pair of bearings 38, each of which is held at one of the respective case parts 21, 22 within the case 20. Due to this fact, the case 20 is a member fixed to and arranged at the body frame F so as to support the main drive shaft 11 and the output shaft 24 in a rotatable manner, and support other composing members in the transmission mechanism M1 through these shafts 11 and 24 and further, support the gear shift mechanism M2.

A multi-stage driven rotating member for transmission acting as a secondary rotating member constituted by a predetermined plurality of more than the number of the main drive sprockets 31 is drivingly connected to the output shaft 24. The multi-stage driven rotating member provides the rotating members of the main drive sprocket 30 at the position crossing with the body central line L1, as seen in a top plan view, in such a way that the driven rotating member is always rotated in integral with the output shaft 24 between both bearings 38.

The aforesaid multi-stage driven rotating member in this preferred embodiment is a multi-stage driven sprocket member 40 constituted by transmission sprockets 41 to 47 acting as the second rotating elements for seven different kinds of transmission having the aforesaid predetermined number of 7 and different outer diameters (i.e. tip diameters).

Then, seven transmission sprockets 41 to 47 ranging from the fastest speed 7-speed transmission sprocket 47 having the minimum outer diameter to the slowest speed one-speed transmission sprocket 41 having the maximum outer diameter are arranged side by side in a direction 44 of the rotary center line L4 also acting as the rotary center line of the driven sprocket member 40, spline connected at the outer circumferential surface in coaxial with the output shaft 24 and drivingly connected to the output shaft 24.

A transmission chain 48, acting as a flexible endless transmission linking loop is applied over the main sprocket member 30 and the driven sprocket member 40, and then a rotation is transmitted by the chain 48 between the main drive shaft 11 and the output shaft 24. More practically, the gear shift mechanism M2 is set such that a chain 48 is applied between the main drive sprocket 31 and an operating sprocket acting as a certain transmission sprocket, selected as one element from the transmission sprockets 41 to 47 by the gear shift mechanism M2 and having the chain 48 wound around it (the transmission sprocket 47 in FIG. 2) by replacing the chain 48 among the transmission sprockets 41 to 47.

As a result of the above-described configuration of parts, the output shaft 24 is rotationally driven by the main drive shaft 11 under a transmission ratio determined by the aforesaid operating sprocket drivingly connected to the main drive sprocket 31 through the chain 48. Then, the power of the output shaft 24 is transmitted to the rear wheel $W_R$ through the main drive sprocket 15, chain 16 and driven sprocket 17 (refer to FIG. 1).

Figure 5:
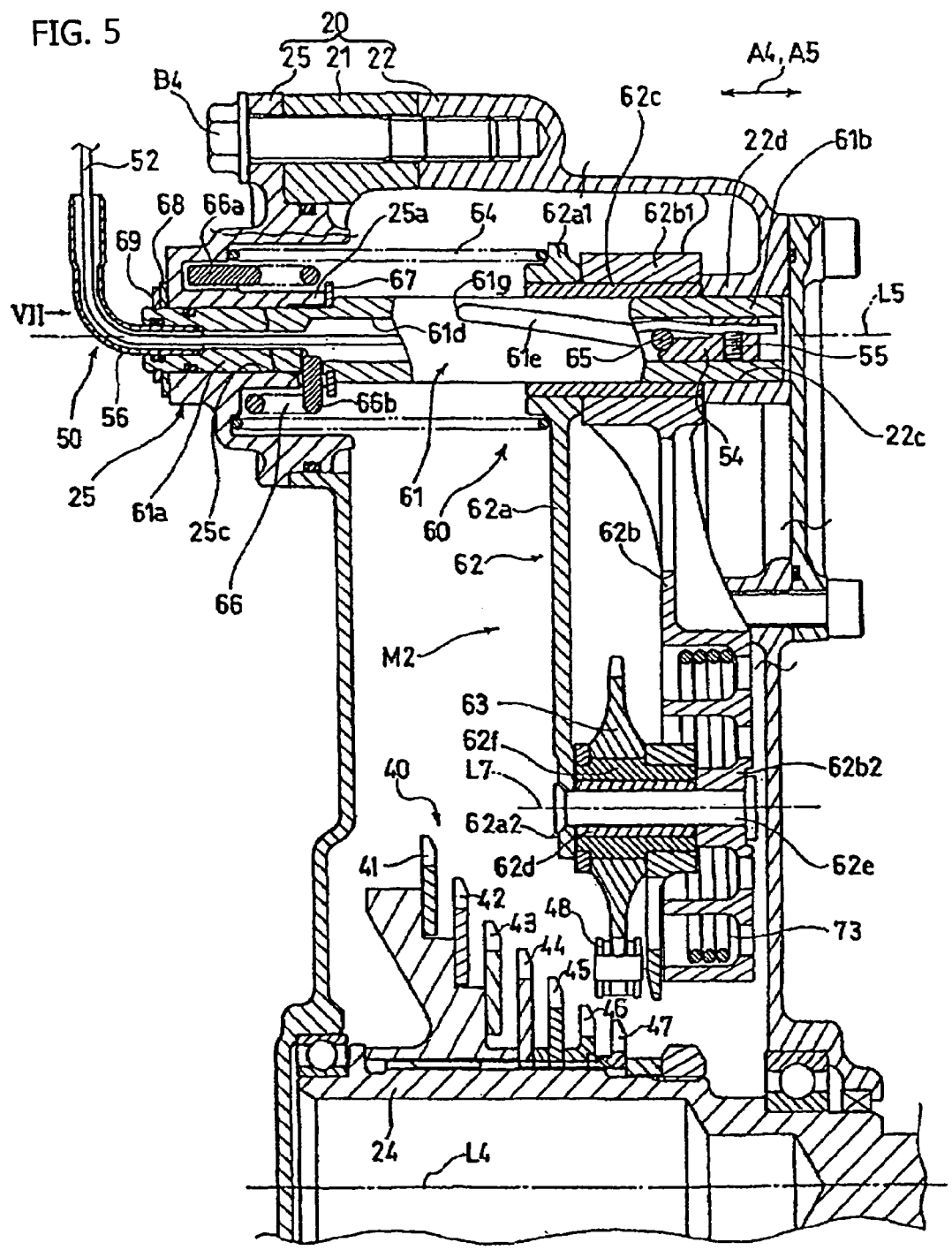
FIG. 5 is a sectional detail view of part of the transmission of FIGS. 2-3, taken along the line V-V of FIG. 3.
Figure 6:
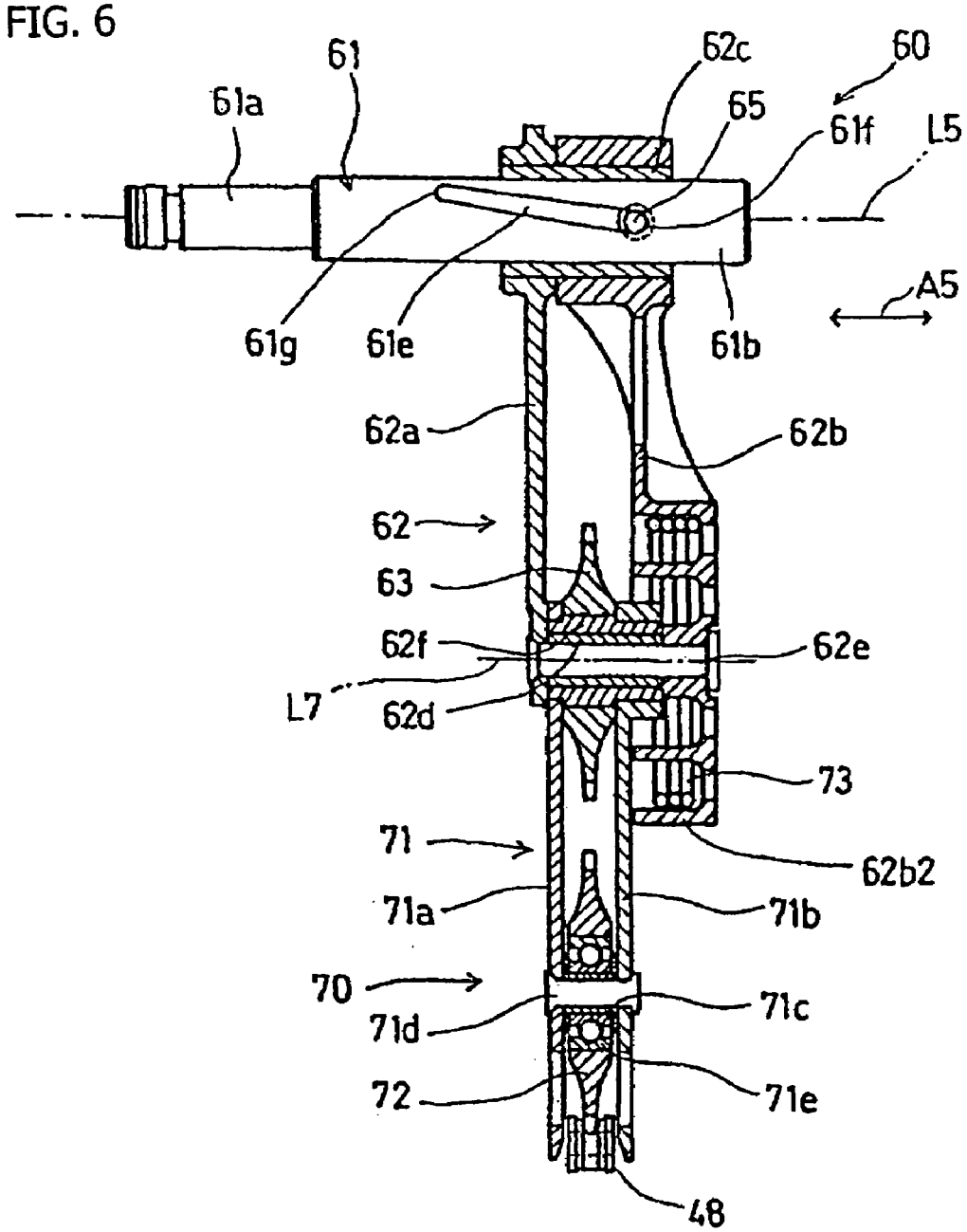
FIG. 6 is a sectional detail view of part of the transmission of FIGS. 2-3, showing the derailleur and the tensioner, and taken along the line VI-VI of FIG. 3.

Referring to FIGS. 3, 5 and 6, the gear shift mechanism M2 operated by the transmission operating mechanism 50 is comprised of a derailleur 60 having a guide pulley 63, and a tension applying unit 70 having a tension pulley 72. Then, the chain 48 is wound around the main drive sprocket 31 and the aforesaid sprocket, and the guide pulley 63 and the tension pulley 72 arranged at a loosening side of the chain 48.

Referring to FIG. 1 together with these figures, the transmission operating mechanism 50 is comprised of a transmission operating member 51 constituted by a transmission lever or the like operated by a driver, a wire 52 for operatively connecting the transmission operating member 51 with the derailleur 60 to transmit an operation of the transmission operating member 51 to the derailleur 60, and an outer tube 53 covering the wire 52. Then, the portion near the case 20 of the wire 52 extending longer than the outer tube 53 is covered by a bellows 57 for prohibiting water and dust.

Referring to FIGS. 2, 3 and 5 to 7, the derailleur 60 is comprised of a derailleur shaft 61 rotatably supported at the case 20; a derailleur arm 62 having base ends 62a1, 62b1 slidably fitted to and supported at the derailleur shaft 61 in such a way that they can be rotationally moved and translated in a direction of the central axis line; a guide pulley 63 acting as a guide rotating member rotatably supported at the extremity ends 62a2, 62b2 of the derailleur arm 62; a pin 65 acting as an operating member for moving the derailleur arm 62 in respect to the derailleur shaft 61 in response to a transmission operation by the transmission operating mechanism 50; a balance spring 66 for acting a balance torque Tb balancing with a torque Ta acting from the derailleur 62 to the derailleur shaft 61 against the derailleur shaft 61; and a return spring 64 for returning the derailleur arm 62 to the first position to be described later.

The derailleur shaft 61 is supported at the case 20 in such a way that its central axis line 5 is in parallel with the rotary center line 17 of the guide pulley 63 and the rotary center line L4 of the driven sprocket member 40. More practically, one end 61a of the derailleur shaft 61 is fitted to a holding hole 25c of a cylinder 25a of the cap 25 connected to the first case 21 by bolts B4 and supported at the first case 21 through the cap 25, and the other end 61b is fitted to a holding hole 22c of a second case 22 and supported at the second case 22.

Motion of the derailleur shaft 61 in one direction (a leftward direction in FIGS. 2 and 5) at the central axis line direction A5 is restricted by an operation in which the washer 67 fitted to the step part formed at an outer circumferential surface of the derailleur shaft 61 is abutted against the extremity end of the cylinder 25a having the holding hole 25c formed at the cap 25.

Motion of the derailleur shaft 61 in the other direction (a rightward direction in FIGS. 2 and 5) at the central axis line direction A5 is restricted under a state of allowing a rotation of the derailleur shaft 61 by an operation in which a set ring 69 fitted to an annular groove formed at the outer circumferential surface is abutted against the washer 68 fitted to the outer circumferential surface of a portion projected from the cap 25 at one end 61a, respectively.

The other end 66b of the balance spring 66 comprised of a twisted coil spring having one end 66a engaged with the cap 25 is engaged with one end 61a having a guide pipe 56 for use in guiding the wire 52 fixed to it and having an inserting hole 61c into which the wire 52 is inserted.

Then, the balancing torque Tb based on a spring force generated at the balancing spring 66 under a rotation of the derailleur shaft 61 along with a rotation of the derailleur arm 62 may act on the derailleur shaft 61, thereby a position of the derailleur shaft 61 in its rotating direction is defined and then the derailleur arm 62 and the guide pulley 63 are rotated on the derailleur shaft 61 rotatably supported at the case 20 in such a way that the chain 48 can be replaced among the transmission sprockets 41 to 47 having different outer diameters in response to the transmission operation at the transmission operating mechanism M2.

The derailleur shaft 61 is formed with a storing hole 61d for movably storing a column-like operating element 54 connected to the wire 52 by the set screw 55 fastening the wire 52 in a direction A5 of the central axis line L5; and a guide hole 61e acting as a guide part for use in guiding the pin 65 moved by the aforesaid operating element 54 through engagement with the operating element 54.

The storing hole 61d is a column-like hole with the central axis line L5 of the derailleur shaft 61 being applied as a central axis line. The guide hole 61e is released to the storing hole 61d and is constituted by a pair of longitudinal holes positioned in opposition to the derailleur shaft 61 in its diameter direction. Each of the aforesaid longitudinal holes extends in the central axis line direction A5 and at the same time formed in a helical shape displaced in a circumferential direction.

The pin 65 is inserted into the guide hole 61e, engaged with the derailleur shaft 61 (refer to FIGS. 2 and 6) to cause the derailleur arm 62 and the guide pulley 63 to be rotated in respect to the derailleur shaft 61 within a changing-over moving range described later while being guided by the guide hole 61e and moved in response to a transmission operation performed by the transmission operating mechanism M2 and at the same time to be translated toward the central axis line direction A5 of the derailleur shaft 61.

The derailleur arm 62 has a cylindrical hub 62c slidably fitted to an outer circumference of the derailleur shaft 61 to be translated in a central axis line direction A5 and rotated; a pair of first and second arms 62a, 62b in which the base ends 62a1, 62b1 are press fitted to the outer circumference of the hub 62c and fixed there; a rivet 62e acting as a connecting member inserted into a collar 62d arranged at the extremity ends of both arms 62a, 62b to define a clearance between both arms 62a, 62b so as to connect both arms 62a, 62b; and a supporting shaft 62f rotatably supported at the outer circumference of the collar 62d fitted to the outer circumference of the rivet 62e and for rotatably supporting the guide pulley 63 between the first and second arms 62a, 62b.

Then, the guide pulley 63 having the chain 48 wound around it is rotated around the supporting shaft 62f with the central line in parallel with the rotary center line L4 of a driven sprocket 40 and the output shaft 24 being applied as a rotary center line L7.

Figure 8:
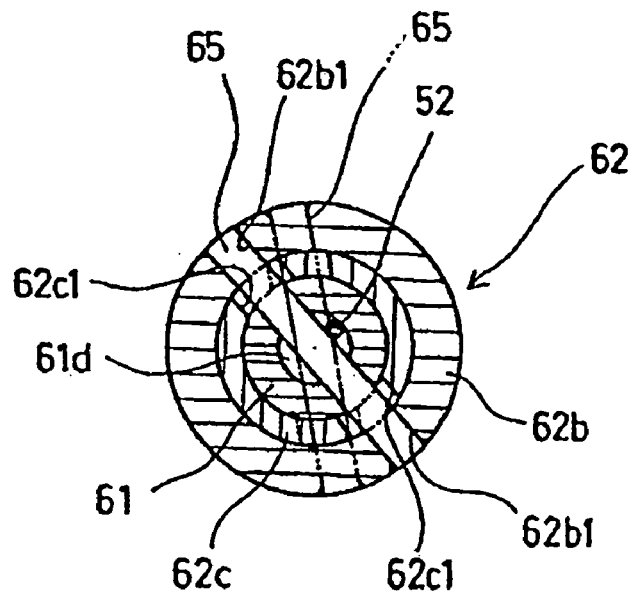
FIG. 8 is a sectional detail view of part of the transmission of FIGS. 2-3, taken along the line VIII-VIII of FIG. 2.

Also referring to FIG. 8, the derailleur arm 62 is driven by the pin 65 moved in response to the transmission operation based on the operation of the transmission operating member 51 (refer to FIG. 1), and the pin 65 inserted into the guide hole 61e to translate in the central axis line direction A5 and rotate in a circumferential direction of the derailleur shaft 61 is fixed to the derailleur arm 62. Due to this fact, both ends of the pin 65 extending to pass through the guide hole 61e and a pair of through-holes 62c1 of the hub 62c are press fitted into a pair of pass-through holes 62b1 formed at the base end 62b1 of the second arm 62b and fixed there.

In addition, the extremity end of the second arm 62b is formed with a spring storing part 62b2 storing a tension spring 73 of a tensioner 70 to be described later, and the tension spring 73 is arranged in the spring storing part 62b2 so as to enclose the rivet 62e.

Referring to FIG. 5, a return spring 64 composed of the compression coil spring is arranged in the case 20 in such a way that its one end is abutted against a spring receiver of the cap 25, and the other end is abutted against the base end 62a1 of the first arm 62a. Then, the return spring 64 biases the derailleur arm 62 in such a way that the base end 62b1 of the second arm 62b is abutted against a stopper 22d formed at the second case 22 and formed with a holding hole 22c when the derailleur arm 62 occupies the first position of the maximum high speed transmission position where the chain 48 is wound around the transmission sprocket 47. At this time, the pin 65 is positioned at one end of the guide hole 61e and a slight clearance is formed between it and one edge 61f of the hole.

Referring to FIGS. 3 and 4, the tensioner 70 is comprised of a holder 71 rotatably supported at the collar 62d of the derailleur arm 62 between the first and second arms 62a, 62b; a tension pulley 72 acting as a tension rotating member rotatably supported at the holder 71; and a tension spring 73. The holder 71 is comprised of a pair of first and second arms 71a, 71b press fitted and fixed to the outer circumference of the supporting shaft 62f at its base end; a collar 71c arranged at the extremity ends of both arms 71a, 71b to define a clearance between both arms 71a, 71b and acting as a supporting shaft of the tension pulley 72; a rivet 71d inserted into the collar 71c and acting as a connecting member holding the collar 71c to connect both arms 71a, 71b; and a bearing 71e fitted to the outer circumference of the collar 71c.

The tension pulley 72 is rotatably supported at the collar 71c between the first and second arms 71a, 71b through a bearing 71e. Then, the chain 48 is wound around a guide pulley 63 and a tension pulley 72 while the first and second arms 71a, 71b are being applied as a chain guide.

As shown in FIG. 3, the tension spring 73 comprised of a twisted coil spring is engaged with the second arm 62b at one end 73*a* and engaged with the second arm 71*b* of the tensioner 70 at the other end 73*b*, its spring force biases the holder 71 and subsequently the tension pulley 72, applies a tension force of appropriate value to the chain 48 to prevent the chain 48 from being loosened.

Referring now to FIGS. 2, 3 and 5, there will be described about a changing-over motion range of the guide pulley 63 and a moving path of the guide pulley 63 within the changing-over motion range for enabling a replacing of the chain 48 guided by the guide pulley 63 to each of the transmission sprockets 41 to 47.

The aforesaid changing-over motion range of the guide pulley 63 under a transmission operation of the transmission operating mechanism 50 is defined by the first position where the derailleur arm 62 is abutted against the stopper 22*d* by a spring force of the return spring 64 and the second position where the pin 65 is moved in one direction (a leftward direction as seen in FIGS. 2 and 5) and the derailleur arm 62 is abutted against the washer 67 acting as a stopper so as to cause the position at the central axis line direction A5 to be set by a cylinder 25*a* of the cap 25.

A translation motion range of the motion range in the central axis line direction A5 in the aforesaid changing-over motion range is set in such a way that the guide pulley 63 can occupy the position at the same central axis line direction as that of the transmission sprocket 47 of minimum outer diameter and the transmission sprocket 41 of maximum outer diameter of the transmission sprockets positioned at both ends of the driven sprocket member 40 in the central axis line direction A4, and in this case, it is determined in reference to the position of the stopper 22*d* at the aforesaid first position and the position of the washer 67 in the central axis line direction A5 at the aforesaid second position.

In turn, a rotating motion range of the motion range in a rotating direction in the aforesaid changing-over motion range is set in correspondence with the transmission sprocket 47 of the minimum outer diameter and the transmission sprocket 41 of the maximum outer diameter in such a way that the guide pulley 63 occupies the position spaced apart outwardly from these transmission sprockets 47, 41 by a predetermined distance in a diameter direction.

In this case, the derailleur shaft 61 is rotatable in respect to the case 20, and in turn, the derailleur shaft is supported under a state in which motion in the central axis line direction A5 is substantially prohibited, so that the aforesaid rotating motion range is produced in reference to the shape of the guide hole 61*e* and a spring force of the tension spring 73 acting against the derailleur arm 62 and it is determined in reference to a balancing position of the derailleur shaft 61 in the rotating direction where a torque Ta and a balancing torque Tb are balanced at the aforesaid first position and the aforesaid second position in dependence on the torque Ta acting on the derailleur shaft 61 through the pin 65 and the balancing torque Tb acted on the derailleur shaft 61 generated by a spring force of the balancing spring 66 so as to be balanced with the torque Ta.

Both orientations and values of these torques Ta, Tb are influenced by some factors such as a spring constant of the tension spring 73, a spring constant of the balancing spring 66, an acting position of a spring force of each of the springs 73, 66 and a shape of each of the derailleur shaft 61, derailleur arm 62 and guide hole 61*e*. Thus, there will be described a case as one example in which the aforesaid rotating motion range and the aforesaid motion path are set in reference to the spring forces of the tension spring 73 and the balancing spring 66.

As indicated by a solid line in FIGS. 2 and 3, when the derailleur arm 62, accordingly the guide pulley 63 occupies the aforesaid first position, both torques Ta, Tb acted on the derailleur shaft 61, i.e. the torque Ta generated by the spring force of the tension spring 73 having one end 73*a* engaged with the second arm 62*b* and the balancing torque Tb are kept in their balanced state.

Figure 7:
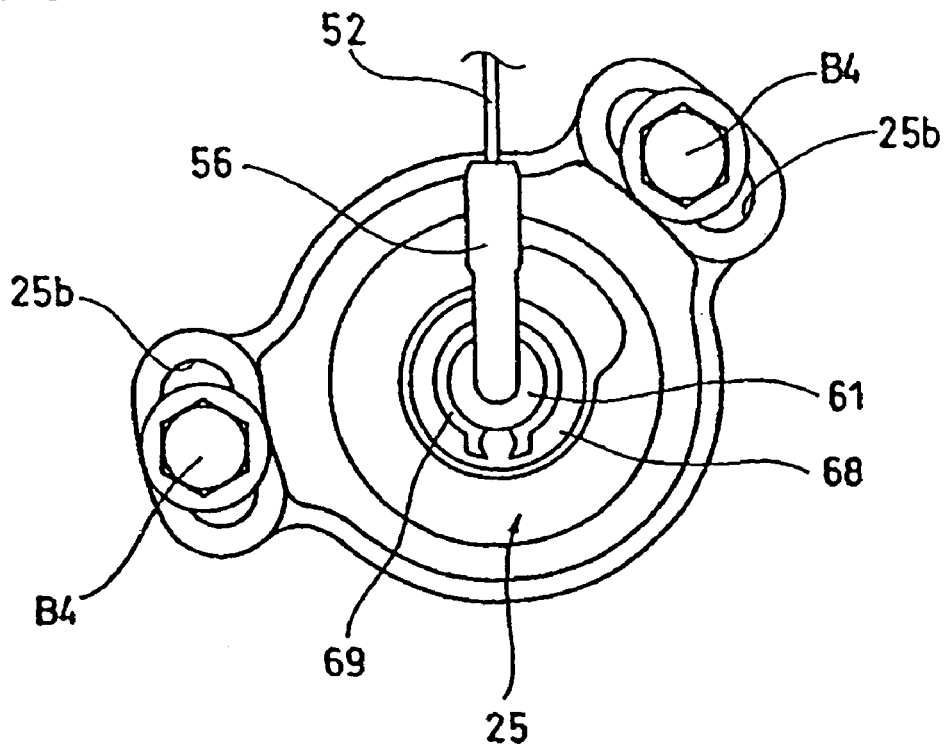
FIG. 7 is a detail view of part of the transmission of FIGS. 2-3, seen from an arrow VII of FIG. 5.

Adjustment of the aforesaid balancing position so as to cause the guide pulley 63 to occupy the aforesaid set first position is carried out by adjusting an initial load of the spring force of the balancing spring 66 at the aforesaid first position. More practically, as shown in FIG. 7, the cap 25 is formed with a pair of insertion holes 25*b* comprised of arcuate longitudinal holes into which each of the pair of bolts B4 is inserted, and the initial load of the balancing spring 66 is adjusted by adjusting the position of the cap 25 in its circumferential direction along these insertion holes 25*b*.

In addition, as indicated by a chain double-dashed line in FIGS. 2 and 3, the torque Ta acting on the derailleur shaft 61 and the balancing torque Tb are kept in a balanced state also in the case that the derailleur arm 62, accordingly the guide pulley 63 occupies the aforesaid second position. Then, a spring constant of the balancing spring 66 is set in such a way that the guide pulley 63 may occupy the aforesaid set second position.

More practically, in the case that the derailleur arm 62 occupies the aforesaid second position where it is rotated in a clockwise direction against the aforesaid first position as shown in FIG. 3 by the operating force acted on the pin 65 through the transmission operating mechanism 50, an angle held by the derailleur arm 62 and a holder 71 of the tensioner 70 is increased to cause the spring force of the tension spring 73 to be increased, and then the torque Ta acted on the derailleur shaft 61 is also increased.

The balancing spring 66 may generate a spring force increased in proportion to the above-mentioned predetermined angle, because the derailleur shaft 61 is rotated from a position in the rotating direction at the first position to a counterclockwise direction only by a predetermined angle with the torque Ta increased as the derailleur arm 62 is rotated. Then, the spring constant of the balancing spring 66 is set in such a way that the increased balancing torque Tb and the increased torque Ta based on the spring force may be balanced at the aforesaid balancing position where the guide pulley 63 occupies the aforesaid second position.

Due to this fact, a rotating angle of the guide pulley 63 attained from the aforesaid first position at the aforesaid balancing position at the aforesaid second position becomes a small angle which is smaller by the aforesaid predetermined angle (for example, 10°) than a rotating angle (for example, 40°) determined in reference to a shape of the guide hole 61*e* under an assumption in which the derailleur shaft 61 is not rotated.

Then, setting of the spring forces of such a tension spring 73 and a balancing spring 66 as described above causes the guide pulley 63 to be moved on the aforesaid motion path within the aforesaid changing-over motion range except the aforesaid first position and the aforesaid second position in such a way that it may occupy the same position in the central axis line direction A5 in respect to each of the transmission sprockets 42 to 46 at each of the transmission positions when the derailleur shaft 61 occupies the aforesaid balancing position and it may occupy the position spaced apart by a predetermined distance in an outward diameter direction.

Due to this fact, when the transmission operating member 51 is operated and the operating element 54 connected to the wire 52 is moved to one direction (a leftward direction in FIGS. 2 and 5) of the central axis line direction A5 so as to direct toward one end 61a in the storing hole 61d for carrying out a replacing of the chain toward the low speed side, the derailleur arm 62 is translated in the central axis line direction A5 against the spring force of the return spring 64 on the derailleur shaft 61 rotated against the spring force of the balancing spring 66 within the aforesaid changing-over motion range together with the pin 65 guided by the guide hole 61e with the operating force acted through the moving operation element 54 and concurrently it is rotated around the derailleur shaft 61.

The chain 48 guided by the guide pulley 63 moved together with the derailleur arm 62 occupying the transmission position determined by an operating amount of the transmission operating member 51 is wound around the aforesaid operating sprocket alternatively selected from a group of transmission sprockets 41 to 47 in response to the transmission position, and the main drive sprocket 31 and the aforesaid operating sprocket are drivingly connected by the chain 48.

Then, there will be described about an action and effects of the preferred embodiment constituted as described above.

As shown in FIGS. 2 and 3, the main drive shaft 11 rotated in a normal rotating direction A0 by a driver operating the pedals 12 under a state in which the transmission sprocket 47 is selected as the aforesaid operating sprocket from a group of transmission sprockets 41 to 47 by the derailleur 60 having the derailleur arm 62 placed at the aforesaid first position, i.e. a state in which the seven-speed position is selected as the transmission position rotationally drives the main drive sprocket 31 through one-way clutch 32 and the slide mechanism S. Due to this fact, the one-way clutch 32 and the slide mechanism S are arranged in a power transmitting path ranging from the main drive shaft 11 to the main drive sprocket 31.

The main drive sprocket 31 rotationally drives the transmission sprocket 47, output shaft 24 and main drive sprocket 15 through the chain 48 under a transmission rate determined by both sprockets 31, 47. The main drive sprocket 15 rotationally drives the driven sprocket 17 (refer to FIG. 1) and the rear wheel $W_R$ through the chain 16. The power of the main drive shaft 11 rotationally driven by the driver is transmitted to the output shaft 24 through the main drive sprocket 31, chain 48 and transmission sprocket 47, the power of the output shaft 24 is transmitted to the rear wheel $W_R$ through the aforesaid driving force transfer mechanism and the bicycle B runs at the seven-speed position.

When the transmission operating member 51 is operated to select the transmission sprocket 41, for example, from the slower-speed transmission sprockets 41 to 46 as the aforesaid operating sprocket so as to change-over the transmission position by the derailleur 60, the operating element 54 moved in a leftward direction in the central axis line direction A5 as seen in FIG. 2 by the wire 52 pushes the pin 65 to cause the pin 65 guided by the guide hole 61e to be moved toward the other edge 61g of the guide hole 61e.

At this time, the derailleur arm 62 moved integrally with the pin 65 and the guide pulley 63 are translated in a leftward direction as seen in FIG. 2 on the derailleur shaft 61 in the central axis line direction A5 and at the same time they are rotated around the derailleur shaft 61 in a clockwise direction as seen in FIG. 3, and when the derailleur arm 62 is abutted against the washer 67, they may occupy the first-speed position (this first-speed position is also the aforesaid second position) which is a transmission position indicated by the chain double-dotted line in FIGS. 2 and 3. The state of the pin 61p at this time is indicated in FIG. 5 by the chain double-dotted line.

Then, the chain 48 moved in a leftward direction as seen in FIG. 2 together with the guide pulley 63 is replaced from the transmission sprocket 47 to the transmission sprocket 41 and drivingly connected to the main drive sprocket 31 through the chain 48. At this time, the main drive sprocket 31 movable by the slide mechanism S in the rotary center line direction A is moved on the major shaft 11a in the rotary center line direction A3 by a partial force of the tension of the chain 48 in the rotary center line direction A3 and occupies the position indicated by the chain double-dotted line in FIG. 2. In addition, the tension pulley 72 occupies the position for applying a tension of suitable value to the chain 48 by the tension spring 73.

In addition, when the transmission operating member 51 is operated to cause the wire 52 to be loosened in such a way that the aforesaid operating sprocket is selected from the faster speed transmission sprockets 42 to 47 than the transmission sprocket 41, the return spring 64 causes the derailleur arm 62 to move toward the aforesaid first position, the guide pulley 63 selects the fast-speed transmission sprockets 42 to 47 as the aforesaid operating sprocket and then the chain 48 is replaced to the aforesaid operating sprocket. Also at this time, the chain 48 causes the main drive sprocket 31 to move up to the position corresponding to a new transmission position in the rotary center line direction A3 in concurrent with motion of the derailleur arm 62, and then the bicycle B runs in a transmission rate at a new transmission position.

In the case that the transmission position is changed over in a similar manner, the derailleur arm 62, guide pulley 63 and tension pulley 72 are moved toward the desired transmission position in response to an operation of the transmission operating member 51 and concurrently the main drive sprocket 31 is moved on the major shaft 11a in the rotary center line direction by a partial force of the tension of the chain 48 in the rotary center line direction A3. Then, the aforesaid one operating sprocket corresponding to a desired transmission position is selected from a group of sprockets 41 to 47 by the derailleur 60, and the main drive sprocket 31 and the operating sprocket are drivingly connected through the chain 48.

In this way, the chain 48 is applied over the main drive sprocket 31 and the aforesaid main drive sprocket of the driven sprocket 40 along the plane crossing at a right angle with the rotary center line 13 of the main drive shaft 11 (this right angle crossing plane in FIG. 2 is in parallel with the body central line L1), i.e. in parallel with the aforesaid right angle crossing plane because the main drive sprocket 31 is moved in the same direction as that of the translation of the derailleur arm 62 in the aforesaid changing-over motion range while being followed to the motion of the derailleur arm 62 for changing-over the transmission position.

Due to this fact, in the case of the transmission apparatus T in which the chain 48 applied over the main drive sprocket 30 drivingly connected to the main drive shaft 11 and the driven sprocket drivingly connected to the output shaft 24 arranged in parallel with the main drive shaft 11, rowed in the rotary center line direction A4 and constituted by the predetermined number of transmission sprockets 41 to 47 more than the number of the main drive sprocket 31 is replaced by the gear shift mechanism M2, the main drive sprocket 31 of the main sprocket member 30 is movably supported at the main drive shaft 11 in the rotary center line direction A3 in such a way that the chain 48 is applied to the main drive sprocket 31 of the main sprocket member 30 along the aforesaid right angle crossing plane crossed at a right angle with the rotary center line L3 and each of the transmission sprockets 41 to 47 of the driven sprocket member 40, i.e. the aforesaid operating sprocket, thereby even in the case that the chain 48 is wound around any one of the transmission sprockets 41 to 47, the main sprocket member 30 is moved in the rotary center line direction in such a way that the chain 48 is applied over the main sprocket member 30 and the driven sprocket member 40 along the aforesaid right angle crossing plane in respect to the rotary center line L3, so that the chain 48 is prevented from being inclined in respect to the aforesaid right angle crossing plane, and the chain 48 is prevented from being removed from the main drive sprocket 31 or the transmission sprockets 41 to 47 without having any relation to an inter-axis distance between the main drive shaft 11 and the output shaft 24 (this inter-axis distance corresponds to a distance between the rotary center line L3 and the rotary center line L4), and accordingly even when the inter-axis distance is short. Further, the chain 48 is prevented from being removed from either the main drive sprocket 31 or the transmission sprockets 41 to 47 during an inertia running state of the bicycle and when the driver stops for operating the pedals 12 during running of the bicycle B to cause the main drive shaft 11 to be stopped or during a running under a state in which the main drive shaft is being rotated in an inverse rotating direction.

Further, the main sprocket member 30 is constituted by one main drive sprocket 31, the main sprocket member 30 can be moved in the rotary center line direction A3 by the slide mechanism S arranged between the main drive shaft 11 and the main sprocket member 30 and at the same time the main drive sprocket member is drivingly connected to the main drive shaft 11, thereby the motion range of the main sprocket member 30 in the rotary center line direction A3 is made minimum and the size of the transmission apparatus T is made small in the rotary center line direction.

In the case of the one-way clutch 32 arranged at the aforesaid power transfer path and the slide mechanism S, the slide mechanism S is arranged between the one-way clutch 32 and the main sprocket member 30, thereby as compared with the case in which an intermediate member, for example, the one-way clutch is present between the slide mechanism S and the main sprocket member 30, an inertia when the main sprocket member 30 is moved in the rotary center line direction A3 becomes low, so that motion of the main sprocket member 30 is made fast during transmission and the effect of preventing the chain from being removed is further improved.

In the case of the transmission apparatus T in which the chain 48 applied to the main sprocket member 30 and the multi-stage driven sprocket member 40 constituted by a plurality of transmission sprockets 41 to 47 is replaced by the gear shift mechanism M2 among the plurality of transmission sprockets 41 to 47, the driven sprocket member 40 drivingly connected to the output shaft 24 always cooperated with the rear wheel $W_R$ and rotated is arranged to be always rotated in an integral manner, the one-way clutch 32 for transmitting a rotation of the main drive shaft 11 in the normal rotating direction A0 to the main sprocket member 30 is arranged in the aforesaid power transmitting path ranging from the main drive shaft 11 to the main sprocket member 30, thereby even under an inertia operating time of the bicycle B, the driven sprocket member 40 integrally rotated with the output shaft 24 always cooperated with the rear wheel $W_R$ and rotated and the main sprocket member 30 wound around the driven sprocket member 40 and drivingly connected to it through the chain 48 being kept in running state are in rotating state and the chain 48 is also kept in its running state, so that the transmission can be carried out through the gear shift mechanism M2, resulting in that the transmission can always be carried out as desired if the bicycle B is in a running state and a running performance of the bicycle B is improved.

The main sprocket member 30 and the one-way clutch 32 are arranged in coaxial with the main drive shaft 11 and at a position where they are not overlapped in the rotary center line direction A3 of the main drive shaft 11, thereby the main sprocket member 30 and the one-way clutch 32 arranged coaxially with the main drive shaft 11 are not restricted in view of a size in the diameter direction by the main drive shaft 11 and the main sprocket member 30, so that a clutch performance such as a clutch capacitance or the like can be easily assured and they can be arranged without producing any reduction in performance of the one-way clutch 32. In addition, assuring a desired rigidity of the main drive shaft 11 is facilitated because a shaft diameter of the shaft part 11a of the main drive shaft 11 is not required to be small for arranging the one-way clutch 32.

The derailleur shaft 61 for supporting in a rotatable and translatable manner in the central axis line direction A5 the derailleur arm 62 for rotatably supporting the guide pulley 63 having the chain 48 wound around among the plurality of transmission sprockets 41 to 47 constituting the driven sprocket member 40 is supported at the case 20 in such a way that its central axis line L5 becomes in parallel with the rotary center line L7 of the guide pulley 63 and the rotary center line L4 of the driven sprocket member 40, thereby the derailleur arm 62 is rotated around the central axis line L4 in parallel with the driven sprocket member 40 and the rotary center line L7 of the guide pulley 63, so that it is not necessary to arrange any specific member for keeping a parallel relation with the rotary center line L7 of the guide pulley 63 and the rotary center line L4 of the driven sprocket member 40 except the derailleur shaft 61 supporting the derailleur arm 62. As a result, the structure of the derailleur 60 is simplified and the number of component parts is reduced, and subsequently the cost is reduced.

Further, the derailleur shaft 61 is rotatably supported at the case 20, the derailleur 60 is provided with the balancing spring 66 for generating a balancing torque Tb acted on the derailleur shaft 61 in response to the spring force generated through rotation of the derailleur shaft 61 accompanied by a rotation of the derailleur arm 62 with the pin 65 moved while being guided by the guide hole 61e in response to the transmitting operation of the transmission operating mechanism 50 so as to cause it to be balanced with the torque Ta acted on the derailleur shaft 61 from the derailleur arm 62 through the pin 65, thereby when the chain 48 is replaced among the plurality of transmission sprockets 41 to 47, the derailleur arm 62 is rotated and translated against the derailleur shaft 61 through the pin 65 and at the same time the derailleur shaft 61 is rotated by the torque Ta acted on the derailleur shaft 61 from the derailleur arm 62 through the pin 65, although the balancing torque Tb generated by the spring force of the balancing spring 66 produced in response to the aforesaid rotation is balanced with the torque Ta and the guide pulley 63 occupies the predetermined replacing position. At this time, the derailleur shaft 61 is not fixed to the case 20, but its rotation is merely restricted by the balancing spring 66, so that normally an excessive outer force exceeding an external force acted on the derailleur arm 62, for example, an excessive tension generated when the chain 48 is engaged with the driven sprocket member 40 during a transmitting operation while the bicycle B is being moved rearwardly under a state in which the driver rides off the bicycle and the chain is rotated together with the driven sprocket member 40 while being locked causes the excessive torque to be generated in the derailleur arm 62 and when the excessive torque acts on the pin 61e and the derailleur shaft 61, the derailleur shaft 61 deforms the balancing spring 66 and rotates, resulting in that the excessive torque is loosened and the excessive torque acted on the derailleur arm 62, pin 65 and derailleur shaft 61 is reduced, these members are prevented from being deformed with the excessive force and so the derailleur 60 and subsequently the transmission apparatus T show an improved durability.

The output shaft 24 at the transmission apparatus T can be easily changed in its arrangement at the transmission apparatus T and a degree of freedom in its arrangement may also be increased in order to adapt for changing in positions of the body frame F or pivot shaft 7 because the chain 48 is used for drivingly connecting the aforesaid sprocket drivingly connected to the output shaft 24 having the chain 16 drivingly connected and the main drive sprocket 31.

There will be described about a modified configuration in regard to the preferred embodiment in which a part of the aforesaid preferred embodiment is changed as follows.

The case 20 of the transmission apparatus T may be made of synthetic resin. Further, it is available that the transmission apparatus T is not provided with the case 20 and in this case, the main drive shaft 11, output shaft 24 and derailleur 60 are fixed to the body frame F or supported at the body frame F through a supporting member such as a bracket and the like integrally formed with the body frame F.

It may also be applicable that a linking loop is used as the endless transmission linking loop for a transmission operation and further pulleys are used as the driving rotating member and the driven rotating member. In addition, it may also be applicable that the endless linking loop is used as an output endless linking loop for the rear wheel $W_R$ and pulleys are used as the output driving rotating member and the output driven rotating member.

In the aforesaid preferred embodiment, although the main drive sprocket 30 is constituted by the main drive sprocket 31 acting as one rotary element, it may also be applicable that the main drive sprocket is constituted by a plurality of main drive sprockets arranged in the rotary center line direction A3 and having different tip diameters.

It is also applicable that the aforesaid engaging mechanism arranged at the slide mechanism S is a spline constituted by several protrusions formed at the outer circumferential surface of the inner cylinder 34 and the inner circumferential surface of the outer cylinder 35 and several grooves to which these protrusions are fitted.

In the case that the main drive sprocket member is separate from the main drive shaft 11 and coaxially arranged at the intermediate rotating shaft rotationally driven by the main drive shaft 11 through the transmission mechanism, one-way clutch 32 is arranged in the power transfer path ranging from the main drive shaft 11 to the aforesaid main drive sprocket member, for example, between the aforesaid intermediate rotating shaft and the main drive sprocket member.

Although the present invention has been described herein with respect to a specific illustrative embodiment thereof, the foregoing description is intended to be illustrative, and not restrictive. Those skilled in the art will realize that many modifications of the preferred embodiment could be made which would be operable. All such modifications which are within the scope of the claims are intended to be within the scope and spirit of the present invention.

Having thus, described the invention, what is claimed is:

1. A transmission apparatus comprising:
   a first rotatable member comprising a first rotatable shaft and at least one first rotatable element operatively attached to the first rotatable shaft;
   a second rotatable member comprising a second rotatable shaft arranged in parallel with said first rotatable shaft, said second rotatable member further comprising a plurality of second rotatable elements operatively attached to said second rotatable shaft, said rotatable elements being greater in number than the number of rotatable elements of said first rotatable member;
   a slide mechanism arranged between said first rotatable shaft and said first rotatable member enabling said first rotatable member to be moved axially relative to its rotating center line, wherein said slide mechanism comprises an inner sleeve, an outer sleeve coaxially surrounding said inner sleeve, and a plurality of bearing elements disposed between said inner and outer sleeves;
   an endless linking loop interconnecting said first rotatable member and said second rotatable member to transmit rotation therebetween; and
   a gear shift mechanism for positioning said endless transmission linking loop among said predetermined number of said second rotatable elements for a transmission operation;
   wherein said endless linking loop is applied over said first rotatable member and said second rotatable member in parallel with a plane crossing a center line of said first rotatable shaft at a right angle.

2. The transmission apparatus of claim 1, wherein said slide mechanism comprises a ball spline mechanism.

3. The transmission apparatus of claim 1, further comprising a hollow case housing said first and second rotatable elements and said linking loop.

4. A bicycle comprising the transmission apparatus of claim 1.

5. The transmission apparatus of claim 1, wherein said linking loop is a chain, wherein said first rotatable element comprises a sprocket, and further comprising a chain guard adjacent said sprocket of said first rotatable element.

6. A transmission apparatus comprising:
   a first rotatable member comprising a first rotatable shaft and at least one first rotatable element driveably connected to the first rotatable shaft;
   a second rotatable member comprising a second rotatable shaft arranged in parallel with said first rotatable shaft, said second rotatable member further comprising a plurality of second rotatable elements greater in number than that of said first rotatable member;
   an endless linking loop interconnecting said first rotatable member and said second rotatable member to transmit rotation therebetween;
   a gear shift mechanism for positioning said endless transmission linking loop among said predetermined number of said second rotatable elements for a transmission operation; and
   a slide mechanism comprising a ball spline mechanism, wherein said slide mechanism is arranged between said first rotatable shaft and said first rotatable member enabling said first rotatable member to be moved axially relative to its rotating center line, and said wherein first rotatable member is connected to said first rotatable shaft through said slide mechanism.

7. The transmission apparatus of claim 6, wherein said slide mechanism comprises an inner cylinder surrounding the first rotatable shaft and having an outer circumferential surface, and an outer cylinder arranged coaxially outside the inner cylinder and having an inner circumferential surface; and wherein said ball spline mechanism comprises:
   a plurality of inwardly facing storing grooves formed in the inner circumferential surface of the outer cylinder,
   a plurality of outwardly facing storing grooves formed in the outer circumferential surface of the inner cylinder and aligned with the inwardly facing storing grooves of the outer cylinder, and
   a plurality of ball bearings disposed in each of the storing grooves between the inner and outer cylinders.

8. The transmission apparatus of claim 6, wherein said slide mechanism comprises an inner sleeve, an outer sleeve coaxially surrounding said inner sleeve, and a plurality of ball bearings disposed between said inner and outer sleeves.

9. The transmission apparatus of claim 6, further comprising a hollow case housing said first and second rotatable elements and said linking loop.

10. A bicycle comprising the transmission apparatus of claim 6.

11. The transmission apparatus of claim 6, wherein said linking loop is a chain, wherein said first rotatable element comprises a sprocket, and further comprising a chain guard adjacent said sprocket of said first rotatable element.

12. A transmission apparatus for a bicycle provided with a derailleur comprising:
   a derailleur shaft supported at a supporting member arranged at a body frame, and formed with a slotted hole therein which functions as a guide part, said derailleur shaft having a cylindrical bore formed therein for receiving an operating element;
   a derailleur arm movably supported at said derailleur shaft;
   a rotatable guide member rotatably supported at said derailleur arm and having an endless transmission linking loop wound around among a plurality of rotatable elements constituting a transmission rotatable member; and
   an operating element which is substantially columnar and which fits into the cylindrical bore of the derailleur shaft, wherein said operating element is provided for pivotally moving said derailleur arm in respect to said derailleur shaft by moving while being guided by said guide part in response to a transmitting operation and at the same time translating said derailleur arm toward a central axis line of said derailleur shaft characterized in that:
   said derailleur shaft is supported in such a way that said central axis line becomes in parallel with a rotary center line of the rotatable guide member and a rotary center line of the transmission rotatable member.

13. A transmission apparatus for a bicycle according to claim 12, wherein said derailleur shaft is rotatably supported at said supporting member; said derailleur has a balancing spring to cause a balancing torque balanced with a torque acted from said derailleur arm to said derailleur shaft to be acted against said derailleur shaft; and said balancing torque is based on a spring force generated at said balancing spring through pivotal movement of said derailleur shaft accompanied by a pivotal movement of said derailleur arm.

\* \* \* \* \*